A. KRAETZER.
AUTOMOBILE BODY.
APPLICATION FILED JAN. 24, 1911.
1,046,201.
Patented Dec. 3, 1912.
Fig. 1.
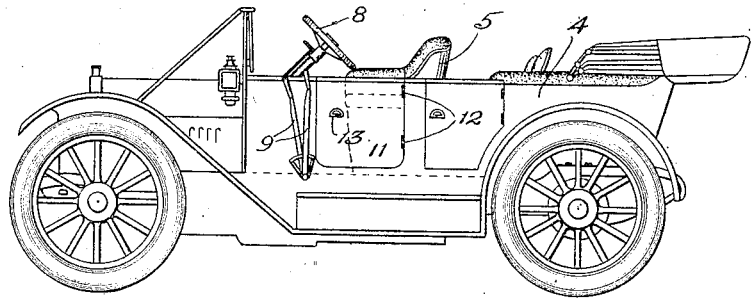
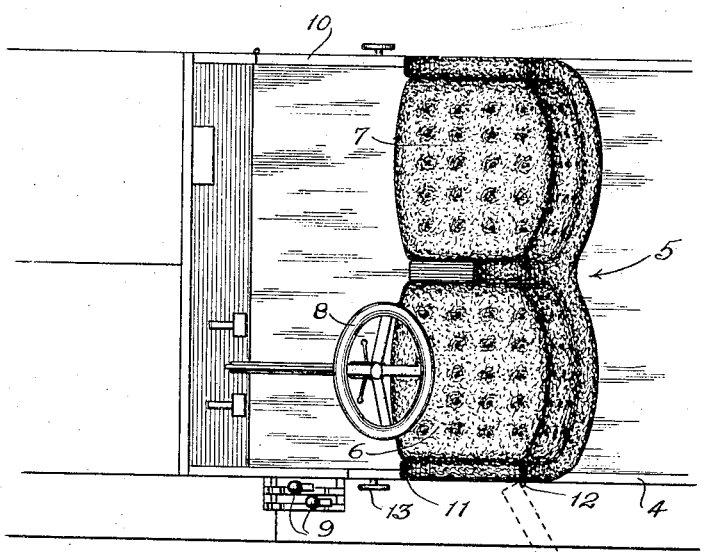
Fig. 2.
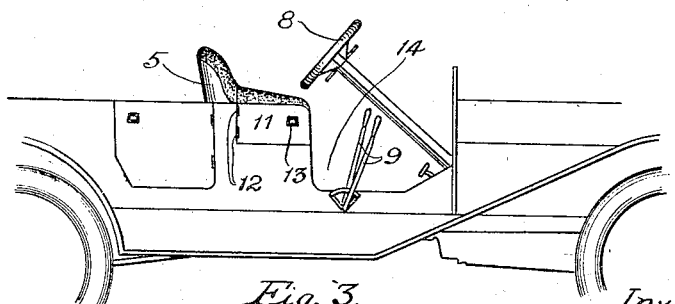
Fig. 3.
Witnesses:
Ephraim Banning
Thomas A. Banning Jr.
Inventor:
Albert Kraetzer
By Banning & Banning
Attorneys.

UNITED STATES PATENT OFFICE.

ALBERT KRAETZER, OF CHICAGO, ILLINOIS.

AUTOMOBILE-BODY.

1,046,201. Specification of Letters Patent. Patented Dec. 3, 1912.

Application filed January 24, 1911. Serial No. 604,348.

*To all whom it may concern:*

Be it known that I, ALBERT KRAETZER, a citizen of the United States, residing at Chicago, in the county of Cook and State of Illinois, have invented certain new and useful Improvements in Automobile-Bodies, of which the following is a specification.

My invention relates to the construction of the body of an automobile, and particularly to the arrangement of the doors therein.

The principal object of the present invention is to provide ready means of egress and ingress for the driver of the machine.

A further object of the invention is to arrange a door beside the driver's seat, forming a part of the seat itself, which shall harmonize with the general design of the car and be capable of swinging outwardly without encountering any controlling levers that may be positioned on the outside of the car.

The invention further relates to the features of construction and the combination of parts hereinafter described and claimed.

In the drawings, Figure 1 is a side elevation of an automobile, equipped with a torpedo type of body, and showing a door of the present invention in open position; Fig. 2 is an enlarged plan view of the driver's seat shown in Fig. 1, showing the door closed in full lines and open in dotted lines; and Fig. 3 is a side elevation of an open type of automobile body, showing a door of the present invention.

The automobiles now in general use are designed with a double forward seat, one section of which is adapted for the use of the driver of the car. Automobiles built with a torpedo body are usually made with a blind door beside the driver's seat, and the mode of egress and ingress for the operator is through a door on the side of the car opposite his seat. In automobiles having the open type of body, the open space at the side of the driver's seat is obstructed by the levers controlling the gears, reverse, emergency brake, etc., and especially by the seat arms or ends, which renders it impracticable for the driver to enter or leave the car on that side. Inasmuch as considerable annoyance and discomfort is occasioned to both the driver and the person who sits beside him whenever it is necessary for the operator to squeeze by the adjacent seat, to pass in or out of the car, the present form of automobile body in this respect is defective, and it is to eliminate such objectionable features that my invention is designed.

The automobile illustrated in the drawings is intended to represent any standard type of car; and the arrangement of the controls, etc., with respect to the position of the driver, as indicated, is such as is ordinarily used. In the drawings there is represented the body portion 4 of a car, equipped with a forward seat 5, which, as shown in Fig. 2, is divided into sections 6 and 7 for the driver and one passenger respectively. Positioned directly in front of the driver's seat is a steering wheel 8 with the usual controls thereon; and pivotally mounted beside said seat, at the side of the car, are the levers 9 for actuating such parts as the emergency brake, reverse, etc.

Exit from the forward seats of the car is provided for by doors 10 and 11, the former of which is on the passenger's side and is of the usual design. The door 11, which is beside the driver's seat and forms the subject matter of the present invention, is hinged as at 12 and latched by a handle 13. It is intended that the outer side of the operator's seat shall constitute a considerable portion of the door itself, so that when the said door is moving into open position, the outer side of said seat is moving with it, leaving on the outside, above the level of the seat, no barrier or obstruction. In order that the maximum space may be provided for the passage of the operator therethrough, the door extends from the rear portion of his seat to the point where the levers 9 are situated. In the open body type, shown in Fig. 3, the hinges on said door are preferably positioned at the rear edge; but in the type of body shown in Fig. 1, the position of the hinges on the door may be either rearward or forward.

When the operator desires to enter the car, he will open the door to the position indicated by the dotted lines in Fig. 2. As he stands upon the running board, he is enabled to seat himself in place, then lift his legs up through the space 14, between the levers 9 and the forward edge of the seat.

The door which constitutes the outer side of the operator's seat may be equipped with cushions similar to those upon the other sides of said seat, so that when it is in closed position a continuous set of cushions will be presented around the sides of the seat, as is usual.

Egress from the car is simple and ready, the removing of the legs through the space 14 to the running board being all that is necessary to permit the operator to leave his seat. The advantages of such an arrangement are numerous. In moments of emergency, no time need be lost in leaving or entering the car. In an auto of the usual type, it is generally impracticable, as well as inconvenient, for the operator to leave his seat quickly. This is because of the obstructing position of the steering wheel and the dividing partition between the seats 6 and 7. It is always necessary for the driver to slide out from under the wheel, his knees in a bent position, across the dividing ridge between the seats, and either lose time in straightening himself to turn and pass before the adjacent person, or else slide across his lap. To return to his seat, the same movements must be executed in the reverse order. Because of the obstructing levers 9 on the driver's side of the car, as well as because of the obstruction offered by the steering wheel, and especially by the side of the seat, it is well nigh impossible to enter or leave the car on the driver's side.

In constructing an automobile body according to the present invention, it is important to note that the cushioned side of the driver's seat itself forms a considerable part of the door. By arranging the door in this manner, so as to open up the outer side of the driver's seat, ample space is provided for entering or leaving the seat without diminishing the size of the seat or extending the car body. A seat so formed differs in appearance from that ordinarily used only in the vertical dividing line which marks off the cushions of the swinging side portion and the curved rear portion.

As shown in Fig. 3, in a car of the open type of body, the door need only extend downward to the level of the seat cushion to permit ready egress from the car, since there is already provided the necessary open space 14 for the passage of the operator. Although only two types of car bodies are illustrated in the drawings—the open and torpedo types—the adaption of the seat-door of my invention to any other design of car, as, for instance, the coupé or limousine, is perfectly apparent.

I claim:

1. The combination with an automobile body of a fixed vehicle seat comprising a seat portion and side arms, at least one of said side arms being swingingly mounted with respect to the entire seat portion, and constituting a door for the automobile body, substantially as described.

2. The combination with an automobile body of a fixed vehicle seat comprising a seat portion and side arms, the said side arms normally lying flush with the automobile body, at least one of said side arms being swingingly mounted with respect to the entire seat portion, and constituting a door for the automobile body, substantially as described.

3. The combination with an automobile body of a fixed driver's seat comprising a seat portion and side arms, and located to one side of said automobile body and in proximity to the steering and driving mechanism therein, the outer side arm of said seat normally lying flush with the automobile body and being swingingly mounted with respect to the entire seat portion, and constituting a door for the automobile body, and adapted when in open position to leave a clear passageway at the side of the seat for direct ingress and egress, substantially as described.

4. In a vehicle, the combination with a fixed seat of a side door hinged to the body of the vehicle and adapted when in closed position to close the side of the vehicle adjacent the seat and to constitute a side arm for the seat, and adapted when in open position to leave a clear passageway at the side of the seat for direct ingress and egress therefrom, substantially as described.

5. In an automobile having a steering device and controlling levers applied at one side thereof, a driver's seat located immediately at the rear of said steering device and levers and provided at the side which is adjacent to said levers with a side section that is movable while the body of the seat remains stationary, and which, when closed forms the side extension of the seat back and which, when opened, permits a person to enter the side sidewise at the rear of the said lever and steering device.

ALBERT KRAETZER.

Witnesses:
WALKER BANNING,
EPHRAIM BANNING.